(12) United States Patent
Spears et al.

(10) Patent No.: US 9,270,868 B2
(45) Date of Patent: Feb. 23, 2016

(54) CHARGE COUPLED DEVICE

(75) Inventors: Kurt E. Spears, Fort Collins, CO (US); Mark W. Majette, San Diego, CA (US); Patrick J. Chase, San Diego, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 3568 days.

(21) Appl. No.: 11/080,225

(22) Filed: Mar. 15, 2005

(65) Prior Publication Data

US 2006/0209201 A1 Sep. 21, 2006

(51) Int. Cl.
  *H04N 1/48* (2006.01)
  *H01L 27/148* (2006.01)
  *H04N 5/335* (2011.01)
  *H04N 3/14* (2006.01)

(52) U.S. Cl.
  CPC ........... *H04N 3/1581* (2013.01); *H04N 3/1562* (2013.01)

(58) Field of Classification Search
  CPC  H04N 1/00795; H04N 1/0402; H04N 1/0449
  USPC ........... 358/474, 483, 513; 345/616; 375/240; 348/252
  See application file for complete search history.

(56) References Cited

U.S. PATENT DOCUMENTS

| | | | |
|---|---|---|---|
| 4,843,481 A * | 6/1989 | Plummer | H04N 1/1004 358/296 |
| 4,875,099 A | 10/1989 | Sakai et al. | |
| 5,262,871 A | 11/1993 | Wilder et al. | |
| 5,461,491 A | 10/1995 | Degi | |
| 5,990,904 A | 11/1999 | Griffin | |
| 6,169,577 B1 | 1/2001 | Iizuka | |
| 6,424,750 B1 | 7/2002 | Colbeth et al. | |
| 6,424,753 B1 * | 7/2002 | Yamaguchi | G06T 3/4007 348/E9.01 |
| 6,483,503 B1 | 11/2002 | Spannaus et al. | |
| 6,570,616 B1 | 5/2003 | Chen | |
| 6,614,562 B1 * | 9/2003 | Minemier | H04N 5/361 348/E5.081 |
| 6,618,088 B1 | 9/2003 | Tsunai et al. | |
| 6,667,818 B1 * | 12/2003 | Kuo | H04N 1/1013 250/208.1 |
| 6,707,496 B1 | 3/2004 | Yang et al. | |
| 6,707,583 B1 | 3/2004 | Tsai et al. | |
| 6,794,627 B2 | 9/2004 | Lyon et al. | |
| 6,927,884 B2 * | 8/2005 | Takada | H01L 27/14609 250/208.1 |
| 7,599,098 B2 * | 10/2009 | Cairns | H04N 1/6011 358/3.21 |
| 2002/0051228 A1 * | 5/2002 | Spears | H04N 1/486 358/445 |
| 2002/0158980 A1 | 10/2002 | Iizuka | |
| 2002/0186312 A1 | 12/2002 | Stark | |
| 2003/0164441 A1 | 9/2003 | Lyon et al. | |
| 2003/0169271 A1 | 9/2003 | Emberling et al. | |
| 2004/0012830 A1 * | 1/2004 | Yokochi | H04N 1/00795 358/474 |
| 2004/0165080 A1 | 8/2004 | Burks et al. | |
| 2005/0140807 A1 * | 6/2005 | Nam | H04N 9/045 348/311 |

FOREIGN PATENT DOCUMENTS

| | | |
|---|---|---|
| EP | 0554116 A2 | 4/1992 |
| WO | WO 99/48281 | 9/1999 |

* cited by examiner

*Primary Examiner* — Akwasi M Sarpong
(74) *Attorney, Agent, or Firm* — Dicke Blllig & Czaja, PLLC

(57) ABSTRACT

Embodiments of a system and method for generating a pixel value use at least a first pixel in a first row of a charge coupled device (CCD) and a first pixel in a second row, adjacent to the first row, of the CCD.

27 Claims, 7 Drawing Sheets

CHARGE COUPLED DEVICE

BACKGROUND

An image capture device may capture a digital image by detecting photons received by a charge coupled device (CCD) or other photosensor array over a time period.

The time period used to expose a pixel of a CCD array to light from the medium often depends on the size of the pixels being exposed. Generally, larger pixels capture greater numbers of photons in a given time period than do smaller pixels, i.e., larger pixels may have a higher sensitivity than smaller pixels. As a result, CCD arrays with larger pixels may operate faster than CCD arrays with smaller pixels. Unfortunately, larger pixels also increase the size of a CCD array. An increase in size of the CCD array may increase the cost of the array. As a result, CCD arrays with relatively large pixels that provide higher speed performance may be more expensive than CCD arrays with relatively small pixels that provide lower speed performance.

DETAILED DESCRIPTION

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As described herein, an embodiment of a charge coupled device, such as a multiple mode linear CCD array, is provided. The multiple mode linear CCD array may be operated in different resolution modes to acquire a digital image from a medium. In one or more of the resolution modes, the digital image is acquired by merging pixel values from different pixels to create the pixel values of the digital image. The merged pixel values may comprise multiple pixel values from pixels in the same row and multiple pixel values from pixels in a different row. In other resolution modes, the digital image is acquired by detecting a separate pixel value from each of a set of pixels. The set of pixels may comprise one or more rows of pixels in the linear CCD array.

Figure 1:
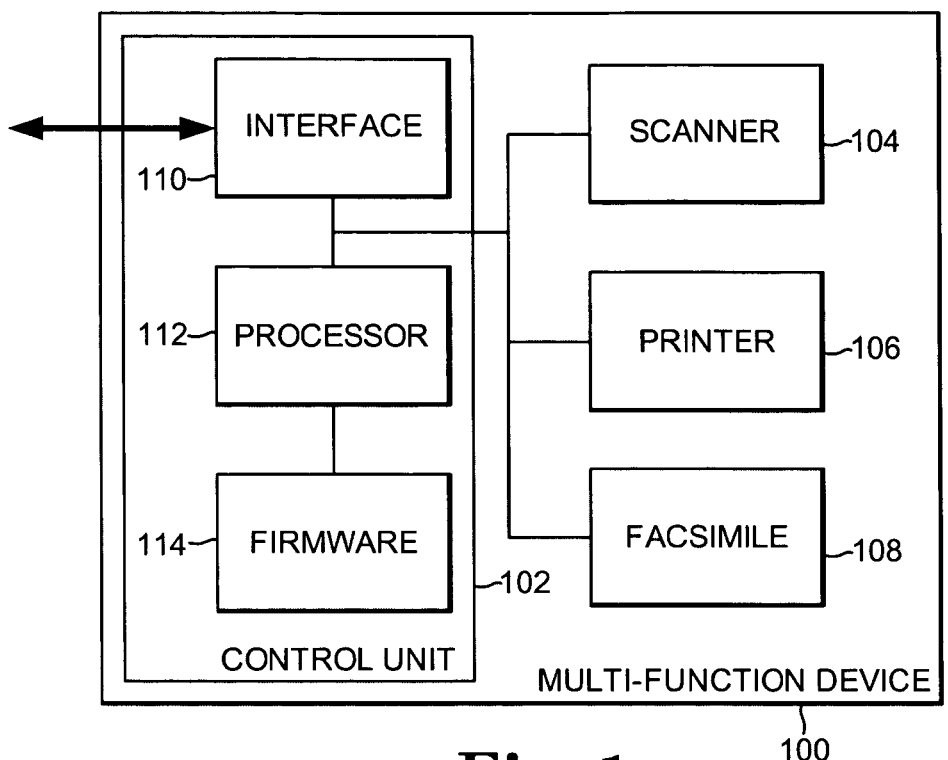
FIG. 1 is a block diagram illustrating an embodiment of a multi-function device according to one embodiment of the present disclosure.

FIG. 1 is a block diagram illustrating one embodiment of a multi-function device 100. Multi-function device 100 comprises a control unit 102, a scanner 104, a printer 106, and a facsimile device 108. Control unit 102 comprises an interface 110, a processor 112, and firmware 114.

Control unit 102 controls and manages the operation of scanner 104, printer 106, and facsimile device 108 in response to information received from an input/output device (not shown) or an external device (not shown) coupled, directly or indirectly, to interface 110. The input/output device may include any combination of buttons, keys, dials, switches, touch-pads, and visual displays, for example. The external device may be a computer system or a print server, for example. Processor 112 executes instructions in firmware 114 to process the signals received from the input/output device and from interface 110 and control and manage the operation of scanner 104, printer 106, and facsimile device 108. Firmware 114 may be stored in any suitable storage medium accessible by processor 112. In addition, firmware 114 may be stored externally to multi-function device 100 prior to being stored internally to multi-function device 100.

Printer 106 comprises any type of impact or non-impact printing device configured to transfer text and/or images to paper or another type of media. Types of printing devices include laser printers, inkjet printers, bubble jet printers, thermal printers, and plotters. Printer 106 receives text and/or images from an external device and prints the text and/or images onto a media, e.g., paper, from one or more media trays (not shown).

Scanner 104 is configured to scan images from a medium into an electronic format and perform processing on the scanned images. Additional details of scanner 104 will be described below with reference to FIGS. 2-10.

Facsimile device 108 is configured to send and receive electronic images using a network connection, e.g., a telephone line or an Internet connection (not shown). Facsimile device 108 acquires an electronic image from a medium using scanner 104 and sends the electronic image to another facsimile or other device using the network connection. In response to receiving an electronic image from the network connection, facsimile device 108 causes printer 106 to print the electronic image onto a medium.

Figure 2:
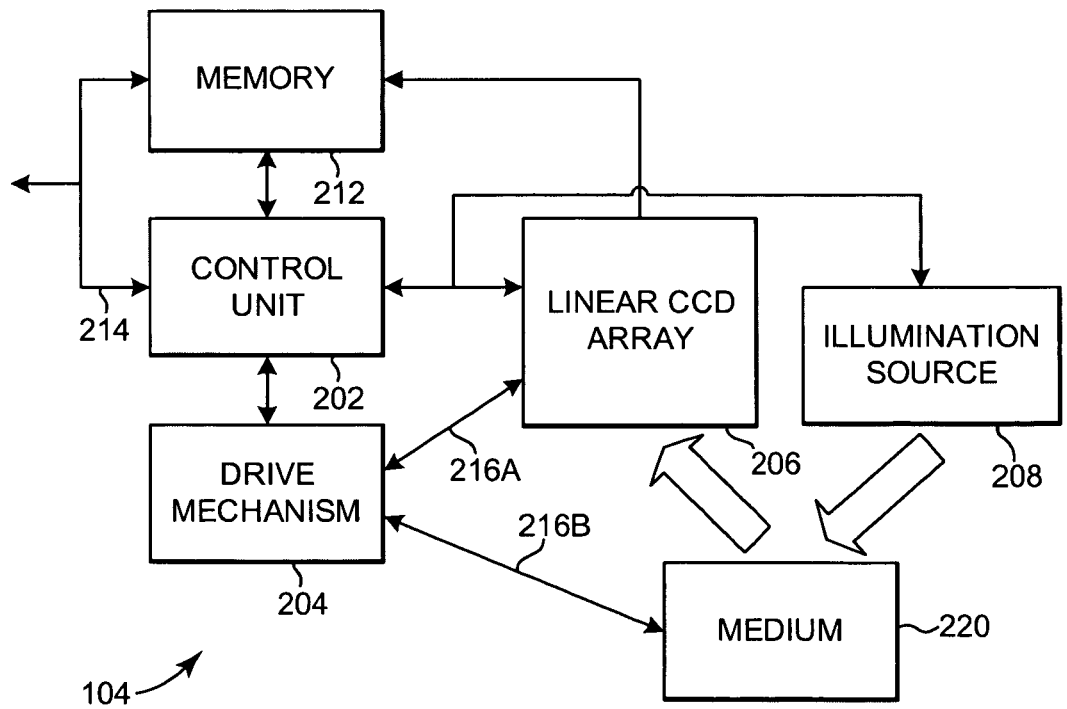
FIG. 2 is a block diagram illustrating an embodiment of a scanner with an embodiment of a multiple mode linear CCD array according to one embodiment of the present disclosure.

FIG. 2 is a block diagram illustrating one embodiment of scanner 104 with a multiple mode linear charge coupled device (CCD) array 206. Scanner 104 comprises a control unit 202, a drive mechanism 204, linear CCD array 206, an illumination source 208, and a memory 212.

Scanner 104 communicates with multi-function device 100 using interface 214. More particularly, control unit 202 of scanner 104 receives a command from control unit 102 in multi-function device 100 to capture an image from a medium 220. Control unit 202 may also receive parameters associated with the command that indicate a resolution mode or other mode of operation with which to capture the image. In response to receiving the command, control unit 202 provides control signals to drive mechanism 204, linear CCD array 206, illumination source 208, and memory 212 to cause the image to be captured from medium 220.

Control unit 202 may comprise any suitable combination of hardware and software components configured to perform the functions described herein. For example, control unit 202 may comprise firmware (not shown) that is executed by a processor (not shown) wherein the firmware is stored in any suitable storage medium accessible by the processor. The firmware may be stored externally to scanner 104 prior to being stored internally to scanner 104.

Responsive to control signals from control unit 202, drive mechanism 204 either moves linear CCD array 206 relative to medium 220 as indicated by an arrow 216A or moves medium 220 relative to linear CCD array 206 as indicated by an arrow 216B to allow regions of medium 220 to be exposed to linear CCD array 206 during an exposure period. During the exposure period, light from illumination source 208 is reflected off of or transmitted through medium 220 and onto linear CCD array 206. The pixels in linear CCD array 206 capture photons to allow raw pixel values associated with the captured photons to be read out of linear CCD array 206 and stored in memory 212. The raw pixel values are processed or converted into pixel values that comprise a digital image of medium 220.

Figure 3:
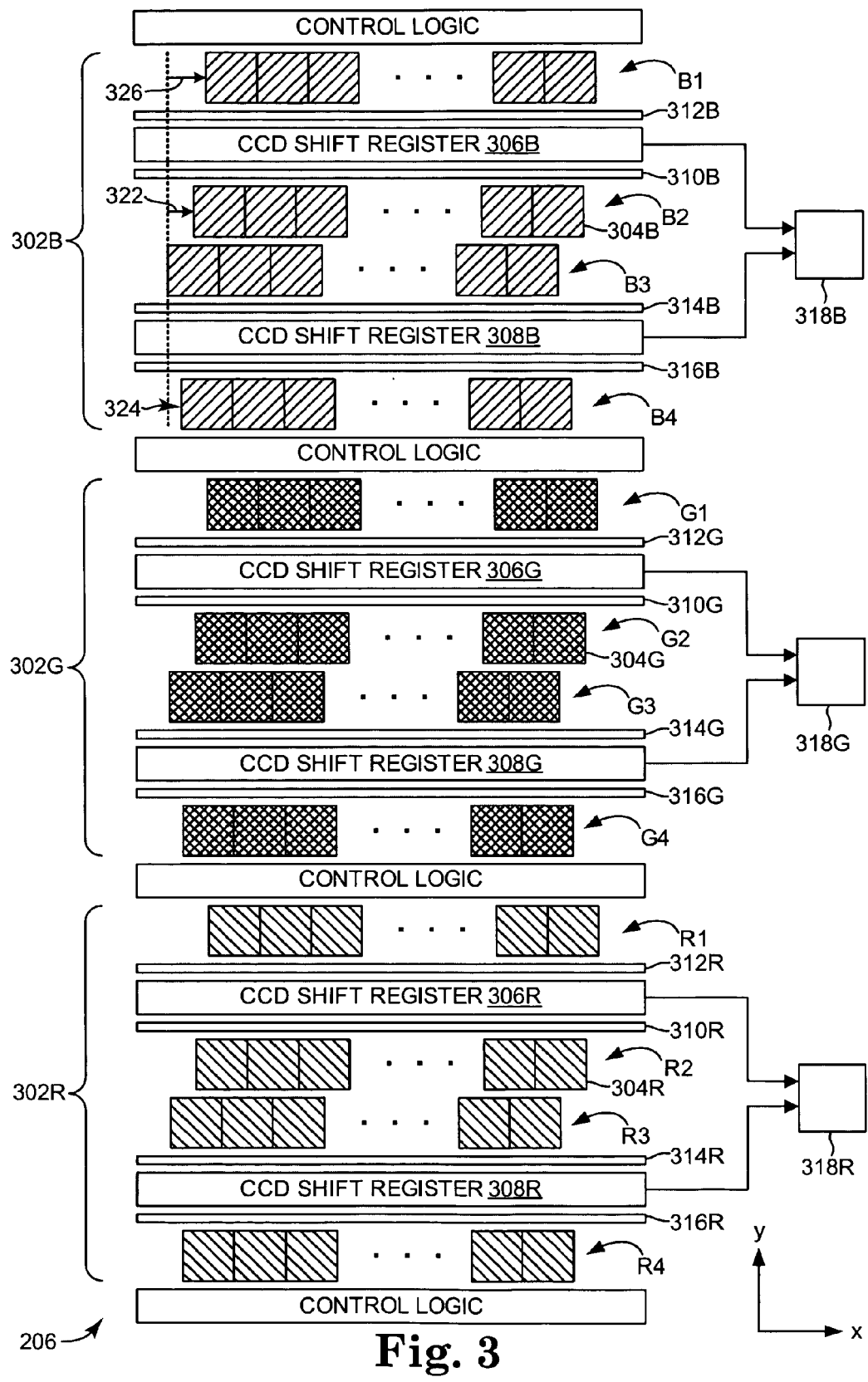
FIG. 3 is a schematic diagram illustrating an embodiment of a multiple mode linear CCD array according to one embodiment of the present disclosure.

FIG. 3 is a schematic diagram illustrating one embodiment of multiple mode linear CCD array 206. Linear CCD array 206 comprises a set of rows 302B with pixels 304B configured for receiving a first color, e.g., blue, a set of rows 302G with pixels 304G configured for receiving a second color, e.g., green, and a set of rows 302R with pixels 304R configured for receiving a third color, e.g., red. In the embodiment of FIG. 3, each set of rows 302B, 302G, and 302R comprises four rows, i.e., rows B1 through B4, rows G1 through G4, and rows R1 through R4, respectively. In other embodiments, each set of rows 302B, 302G, and 302R may comprise other numbers of rows greater than or equal to two.

Linear CCD array 206 comprises CCD shift registers 306B and 308B for the set of rows 302B, CCD shift registers 306G and 308G for the set of rows 302G, and CCD shift registers 306R and 308R for the set of rows 302R. In the set of rows 302B, gate logic 310B and 312B comprise circuitry to control the shifting of charge from row B2 to CCD shift register 306B and from row B1 to CCD shift register 306B, respectively, and gate logic 314B and 316B comprise circuitry to control the shifting of charge from row B3 to CCD shift register 308B and from row B4 to CCD shift register 308B, respectively. Gate logic 310G, 312G, 314G, and 316G function similarly for the set of rows 302G, and gate logic 310R, 312R, 314R, and 316R function similarly for the set of rows 302R. Linear CCD array 206 also comprises control logic interspersed between the sets of rows 302B, 302G, and 302R.

Linear CCD array 206 further comprises output nodes 318B, 318G, and 318R for sets of rows 302B, 302G, and 302R, respectively. After charge is stored in shift registers 306B and 308B, the charge for each pixel 304B is shifted serially from shift registers 306B and 308B into output node 318B. Depending on the mode of operation, charge from shift registers 306B and 308B may be alternately shifted during different portions of a clock cycle. Output nodes 318G and 318R function similarly for the sets of rows 302G and 302R, respectively.

Each row in sets of rows 302B, 302G, and 302R has a set pixel resolution, e.g., 1200 dots per inch, in the direction parallel to the row, i.e., the x direction. In addition, the rows of each set of rows 302B, 302G, and 302R are offset from one another in the direction parallel to the rows. For example, row B2 is offset from row B3 by a distance equal to one-half of a width of a pixel 304B in the positive x direction as indicated by an arrow 322 in set of rows 302B. Row B1 is offset from row B2 by a distance equal to one-fourth of a width of a pixel 304B in the positive x direction as indicated by an arrow 326 in set of rows 302B. Row B4 is offset from row B3 by a distance equal to one-fourth of a width of a pixel 304B in the positive x direction as indicated by an arrow 324 in set of rows 302B. Sets of rows 302G and 302R are similarly configured. In other embodiments, other offset distances between the various rows in sets of rows 302B, 302G, and 302R may be used.

Linear CCD array 206 may be operated in different resolution modes to acquire a digital image from medium 220. In one or more of the resolution modes, the digital image is acquired by merging pixel values from different pixels 304 to create the pixel values of the digital image. The merged pixel values may comprise multiple pixel values from pixels 304 in the same row from sets of rows 302B, 302G, and 302R and multiple pixel values from pixels 304 in a different row from sets of rows 302B, 302G, and 302R. In other resolution modes, the digital image is acquired by detecting a separate pixel value from each of a set of pixels 304. The set of pixels 304 may comprise one or more rows of sets of rows 302B, 302G, and 302R of pixels 304 in the linear CCD array.

Figure 4:
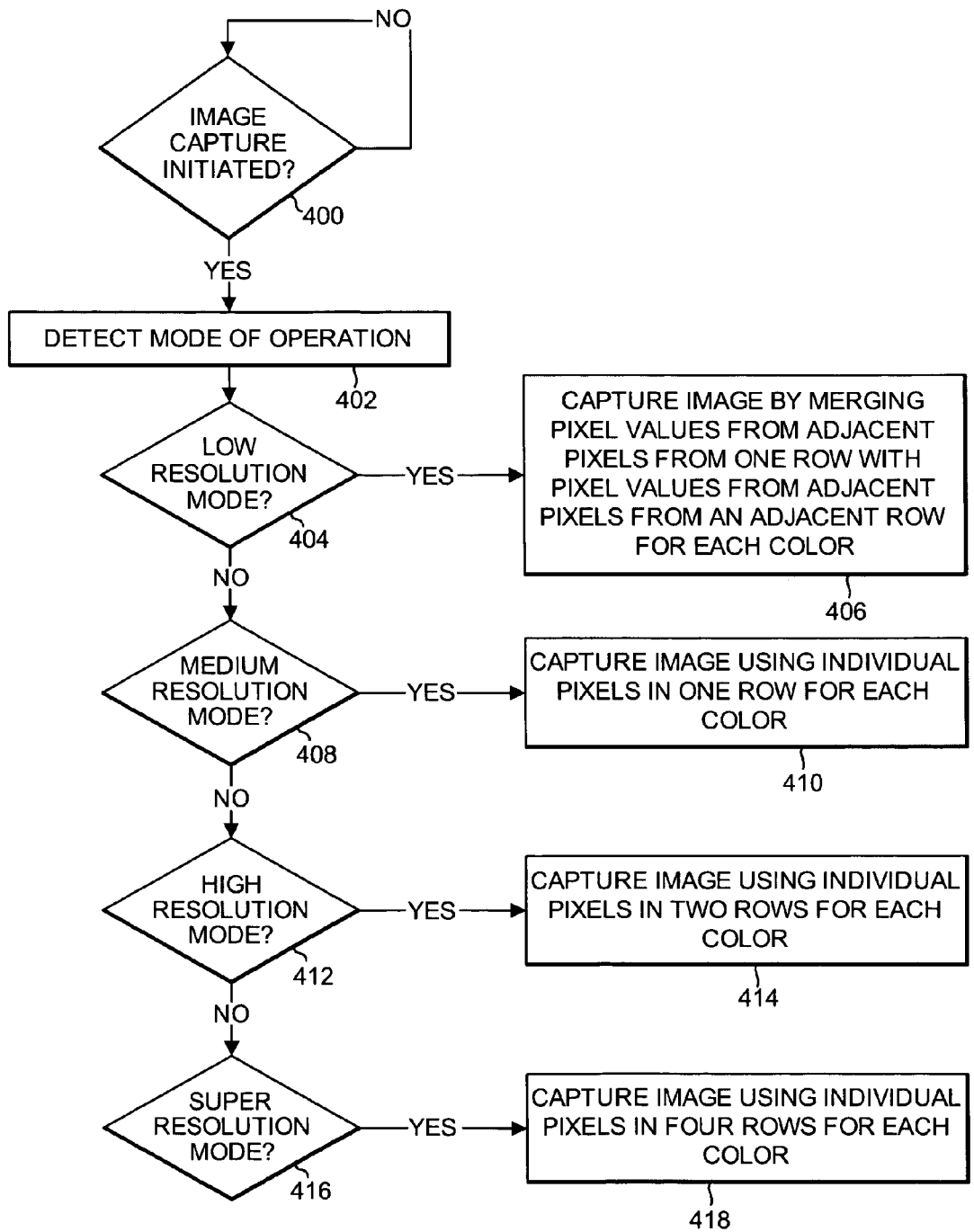
FIG. 4 is a flow chart illustrating an embodiment of a method for capturing an image using an embodiment of a multiple mode linear CCD array according to one embodiment of the present disclosure.

FIG. 4 is a flow chart illustrating one embodiment of a method for capturing an image using the various resolution modes of operation, i.e., resolution modes, of linear CCD array 206. The resolution modes referenced in the embodiment of FIG. 4 will be illustrated with reference to the embodiments of FIGS. 5-10. In the embodiment of FIG. 4, a determination is made by scanner 104 as to whether an image capture process has been initiated as indicated in a block 400. An image capture process may be initiated in response to scanner 104 receiving a command or other signal from multi-function device 100 that indicates an image capture is to be performed.

Once an image capture process has been initiated, scanner 104 detects a mode of operation associated with the image capture as indicated in a block 402. In one embodiment, scanner 104 detects the mode of operation from a parameter or other signal received from multi-function device 100 that indicates the mode of operation. In other embodiments, scanner 104 detects the mode of operation by accessing information stored in memory 212 or another memory (not shown) that indicates the mode of operation.

A determination is made by scanner 104 as to whether the mode operation is a low resolution mode as indicated in a block 404. If the mode operation is a low resolution mode, then scanner 104 captures the image from medium 220 by merging pixel values from adjacent pixels from one row with pixel values from adjacent pixels from an adjacent row for each color to generate the digital image pixel values as indicated in a block 406. The function of block 406 is illustrated in FIGS. 5 and 6.

Figure 5:
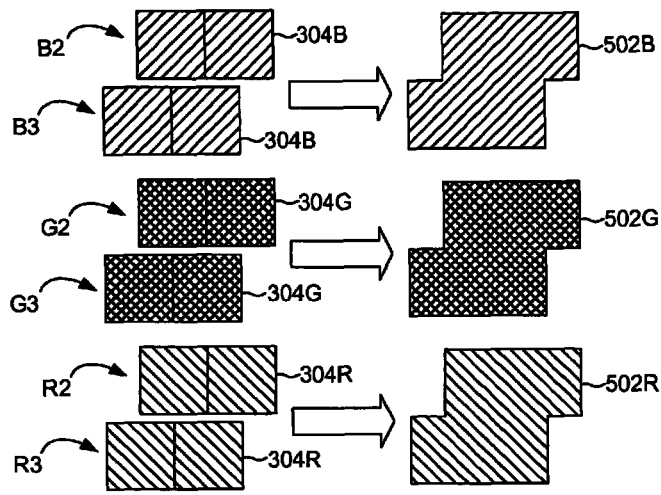
FIG. 5 is a schematic diagram illustrating capturing pixel values for an image in a first mode of operation of an embodiment of a linear CCD array according to one embodiment of the present disclosure.

FIG. 5 is a schematic diagram illustrating one embodiment of capturing pixel values for an image in a first mode, i.e., low resolution mode, of operation of linear CCD array 206. As illustrated in the embodiment of FIG. 5, linear CCD array 206 merges two pixel values from adjacent pixels 304 from one row with two pixel values from adjacent pixels 304 from an adjacent row for each color using shift registers 306 and 308 and output node 318. More particularly, linear CCD array 206 merges two pixel values from adjacent pixels 304B in row B2 with two pixel values from adjacent pixels 304B in row B3 to generate a single pixel value 502B of a first color, i.e., blue. Similarly, linear CCD array 206 merges two pixel values from adjacent pixels 304G in row G2 with two pixel values from adjacent pixels 304G in row G3 to generate a single pixel value 502G of a second color, i.e., green. Further, linear CCD array 206 merges two pixel values from adjacent pixels 304R in row R2 with two pixel values from adjacent pixels 304R in row R3 to generate a single pixel value 502R of a third color, i.e., red.

Figure 6:
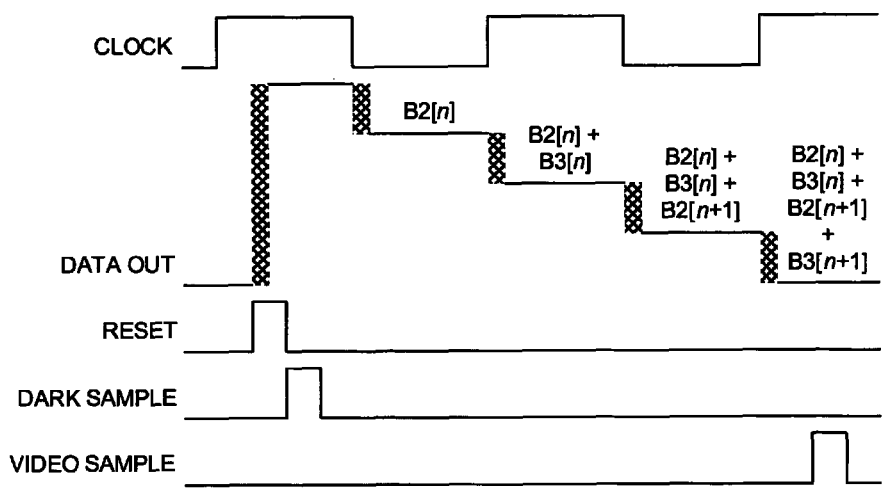
FIG. 6 is a timing diagram illustrating capturing a pixel value for an image in a first mode of operation of an embodiment of a linear CCD array according to one embodiment of the present disclosure.

FIG. 6 is a timing diagram illustrating one embodiment of capturing a pixel value for an image in the low resolution mode of operation of linear CCD array 206. The timing diagram illustrates a clock signal, a data out signal, a reset signal, a dark sample signal, and a video sample signal of linear CCD array 206.

During a clock pulse, control unit 202 asserts the reset signal to cause output node 318B in linear CCD array 206 to be cleared. As a result, the data out signal transitions to a first, or reset, level. Control unit 202 asserts the dark sample signal after the reset signal to cause the first level of output node 318B to be stored as a dark sample for comparison.

On the clock edge following the dark sample signal, control unit 202 causes charge corresponding to the pixel value for the nth pixel in row B2, i.e., pixel B2[n] where n is a whole odd number, to be transferred to output node 318B to cause the data out signal to change to a second level. On the next clock edge, control unit 202 causes charge corresponding to the pixel value for the nth pixel in row B3, i.e., pixel B3[n], to be transferred to output node 318B to cause the data out signal to change to a third level such that the third level represents the merged sum of the pixel values for pixels B2[n] and B3[n]. As shown in the embodiment of FIG. 3, row B2 is adjacent to row B3. Pixels B2[n] and B3[n] are also adjacent, but offset by one-half of a width of a pixel 304B.

On the next clock edge, control unit 202 causes charge corresponding to the pixel value for the (n+1)th pixel in row B2, i.e., pixel B2[n+1], to be transferred to output node 318B to cause the data out signal to change to a fourth level such that the fourth level represents the merged sum of the pixel values for pixels B2[n], B3[n], and B2[n+1]. Pixel B2[n+1] is adjacent to pixel B2[n] in row B2. On the next clock edge, control unit 202 causes charge corresponding to the pixel value for the (n+1)th pixel in row B3, i.e., pixel B3[n+1], to be transferred to output node 318B to cause the data out signal to change to a fifth level such that the fifth level represents the merged sum of the pixel values for pixels B2[n], B3[n], B2[n+1], and B3[n+1]. Pixel B3[n+1] is adjacent to pixel B3[n] in row B2.

During the clock cycle in which the data out signal is at the fifth level, control unit 202 asserts the video sample signal to cause the data out signal to be compared to the dark sample to generate a pixel value 502B associated with the four merged pixels B2[n], B3[n], B2[n+1], and B3[n+1]. The pixel value 502B is stored in memory 212.

Each pixel value 502B for the remaining pixels 304B in rows B2 and B3 is generated sequentially as just described. In addition, the pixel values 502G and 502R for the pixels 304G in rows G2 and G3 and the pixels 304R in rows R2 and R3, respectively, are generated in parallel with generating the pixel values 502B.

In other embodiments, the low resolution mode may be implemented by combining other numbers of pixels from rows B2 and B3. For example, four pixels from row B2 may be combined with four pixels from row B3 to generate pixel value 502B. As another example, one pixel from row B2 may be combined with one pixel from row B3 to generate pixel value 502B.

Returning to the embodiment of FIG. 4, if the mode operation is not a low resolution mode, then a determination is made by scanner 104 as to whether the mode operation is a medium resolution mode as indicated in a block 408. If the mode operation is a medium resolution mode, then scanner 104 captures the image from medium 220 using individual pixels in one row for each color as indicated in a block 410. The function of block 410 is illustrated in the embodiments of FIGS. 7 and 8.

Figure 7:
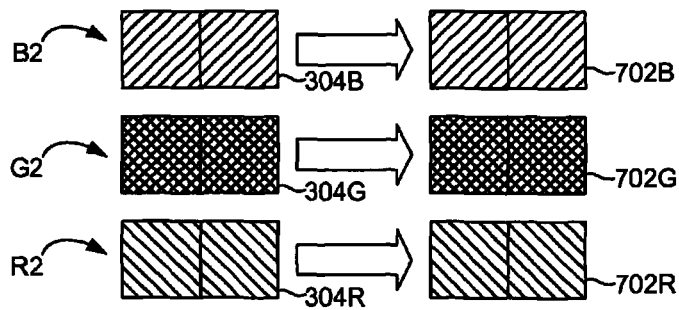
FIG. 7 is a schematic diagram illustrating capturing pixel values for an image in a second mode of operation of an embodiment of a linear CCD array according to one embodiment of the present disclosure.

FIG. 7 is a schematic diagram illustrating one embodiment of capturing pixel values for an image in a second mode, i.e., medium resolution mode, of operation of linear CCD array 206. As illustrated in the embodiment of FIG. 7, linear CCD array 206 generates pixel values 702B, 702G, and 702R for the digital image from individual pixels in rows B2, G2, and R2, respectively. In other embodiments, another row in each set of rows 302B, 302G, and 302R may be used, e.g., rows B1, G1, and R1.

Figure 8:
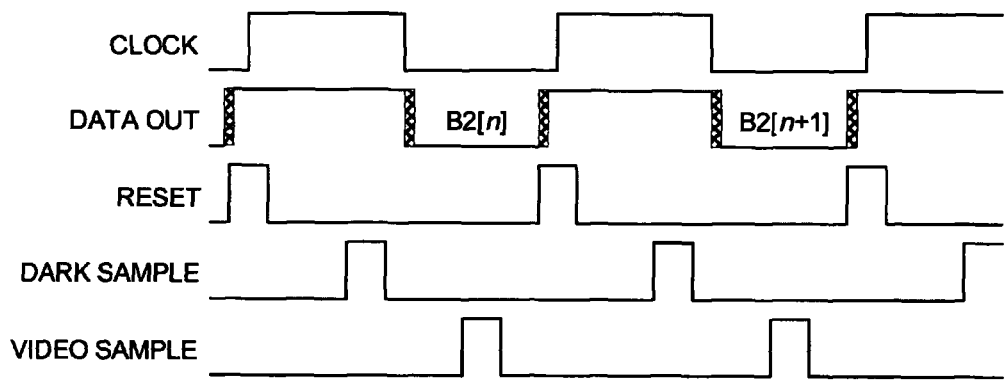
FIG. 8 is a timing diagram illustrating capturing a pixel value for an image in a second mode of operation of an embodiment of a linear CCD array according to one embodiment of the present disclosure.

FIG. 8 is a timing diagram illustrating one embodiment of capturing pixel values for an image in the medium resolution mode of operation of linear CCD array 206. The timing diagram illustrates a clock signal, a data out signal, a reset signal, a dark sample signal, and a video sample signal of linear CCD array 206. During the rising clock edge, control unit 202 asserts the reset signal to cause output node 318B in linear CCD array 206 to be cleared. As a result, the data out signal transitions to a first or dark level. Control unit 202 asserts the dark sample signal after the reset signal to cause the first level to be stored as a dark sample for comparison.

On the falling clock edge following the dark sample signal, control unit 202 causes charge corresponding to pixel value for a pixel in row B2, i.e., pixel B2[n] where n is a whole number, to be transferred to output node 318 to cause the data out signal to change to a second level. Control unit 202 asserts the video sample signal while the data out signal is at the second level to cause the data out signal to be compared to the dark sample to generate a pixel value 702B associated with the pixel B2[n]. The pixel value 702B is stored in memory 212.

On the next rising clock edge, the reset and dark sample signals are asserted as described above. On the falling clock edge following the dark sample signal, control unit 202 causes charge corresponding to pixel value for a next pixel in row B2, i.e., pixel B2[n+1] where n is a whole number, to be transferred to output node 318 to cause the data out signal to be changed to a third level. Control unit 202 asserts the video sample signal while the data out signal is at the third level cause the data out signal to be compared to the dark sample to generate a pixel value 702B associated with the pixel B2[n+1]. The pixel value 702B is stored in memory 212.

The process repeats for each pixel in row B2. The pixel values 702G and 702R for the pixels 304G in row G2 and the pixels 304R in row R2, respectively, are generated in parallel with generating the pixel values 702B as just described.

Returning to the embodiment of FIG. 4, if the mode operation is not a medium resolution mode, then a determination is made by scanner 104 as to whether the mode operation is a high resolution mode as indicated in a block 412. If the mode operation is a high resolution mode, then scanner 104 captures the image from medium 220 using individual pixels in two rows for each color as indicated in a block 414. The function of block 414 is illustrated in the embodiments of FIGS. 9 and 10.

Figure 9:
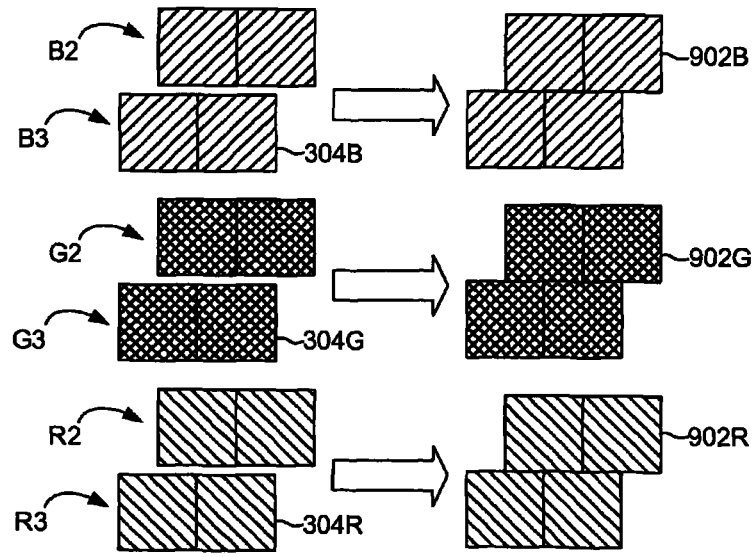
FIG. 9 is a schematic diagram illustrating capturing pixel values for an image in a third mode of operation of an embodiment of a linear CCD array according to one embodiment of the present disclosure.

FIG. 9 is a schematic diagram illustrating one embodiment of capturing pixel values for an image in a third mode, i.e., high resolution mode, of operation of linear CCD array 206. As illustrated in the embodiment of FIG. 9, linear CCD array 206 generates pixel values 902B, 902G, and 902R for the digital image from individual pixels in rows B2 and B3, G2 and G3, and R2 and R3, respectively. In other embodiments, another set of two rows from each set of rows 302B, 302G, and 302R may be used, e.g., rows B1 and B4, G1 and G4, and R1 and R4.

Figure 10:
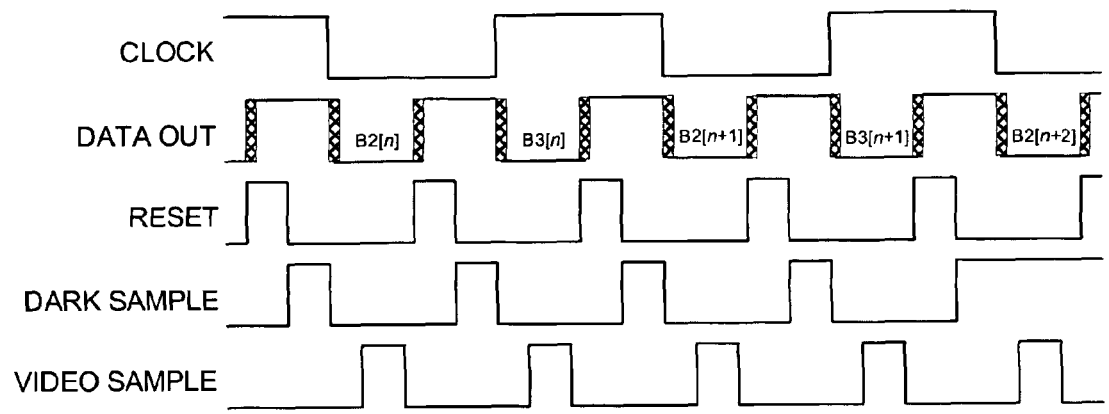
FIG. 10 is a timing diagram illustrating capturing a pixel value for an image in a third mode of operation of an embodiment of a linear CCD array according to one embodiment of the present disclosure.

FIG. 10 is a timing diagram illustrating one embodiment of capturing pixel values for an image in the high resolution mode of operation of linear CCD array 206. The timing diagram illustrates a clock signal, a data out signal, a reset signal, a dark sample signal, and a video sample signal of linear CCD array 206. During a clock pulse, control unit 202 asserts the reset signal to cause output node 318B in linear CCD array 206 to be cleared. As a result, the data out signal transitions to a first or dark level. Control unit 202 asserts the dark sample signal after the reset signal to cause the first level to be stored as a dark sample for comparison.

On the clock edge following the dark sample signal, control unit 202 causes charge corresponding to pixel value for a pixel in row B2, i.e., pixel B2[n] where n is a whole number, to be transferred to output node 318 to cause the data out signal to change to a second level. Control unit 202 asserts the video sample signal while the data out signal is at the second level to cause the data out signal to be compared to the dark sample to generate a pixel value 902B associated with the pixel B2[n]. The pixel value 902B is stored in memory 212.

Subsequent to the video sample signal, the reset and dark sample signals are asserted as described above. On the clock edge following the dark sample signal, control unit 202 causes charge corresponding to pixel value for a pixel in row B3, i.e., pixel B3[n] where n is a whole number, to be transferred to output node 318 to cause the data out signal to be changed to a third level. Control unit 202 asserts the video sample signal while the data out signal is at the third level cause the data out signal to be compared to the dark sample to generate a pixel value 902B associated with the pixel B3[n]. The pixel value 902B is stored in memory 212.

The process repeats for each pixel in rows B2 and B3, e.g., pixel B2[n+1], B3[n+1], and B2[n+2], etc, as shown in the embodiment of FIG. 10. The pixel values 902G and 902R for the pixels 304G in rows G2 and G3 and the pixels 304R in rows R2 and R3, respectively, are generated in parallel with generating the pixel values 902B as just described.

In another embodiment, control unit 202 causes the pixel values 902B from rows B2 and B3 to be generated in a sequential manner. In this embodiment, the pixel values 902B for pixels from row B2 are generated and the pixel values 902B from row B3 are generated subsequent to the generating the pixel values 902B from row B2. The pixel values 902G and 902R for the pixels 304G in rows G2 and G3 and the pixels 304R in rows R2 and R3, respectively, are generated in parallel with generating the pixel values 902B as just described in this alternative embodiment.

Returning to the embodiment of FIG. 4, if the mode operation is not a high resolution mode, then a determination is made by scanner 104 as to whether the mode operation is a super resolution mode as indicated in a block 416. If the mode operation is a super resolution mode, then scanner 104 captures the image from medium 220 using individual pixels in four rows for each color as indicated in a block 418. The function of block 418 is illustrated in the embodiments of FIGS. 11 and 12.

Figure 11:
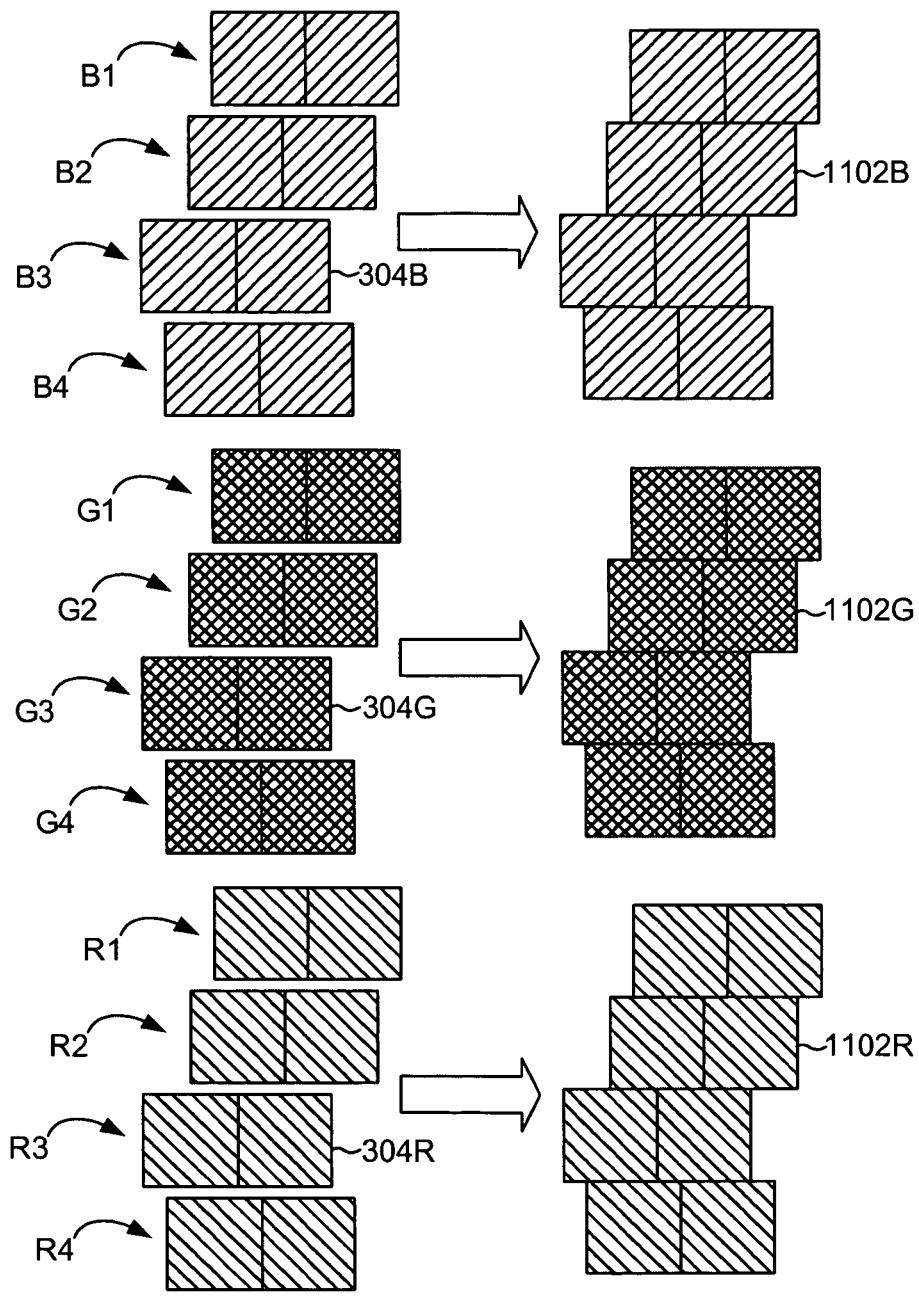
FIG. 11 is a schematic diagram illustrating capturing pixel values for an image in a fourth mode of operation of an embodiment of a linear CCD array according to one embodiment of the present disclosure.

FIG. 11 is a schematic diagram illustrating one embodiment of capturing pixel values for an image in a fourth mode, i.e., super resolution mode, of operation of linear CCD array 206. As illustrated in the embodiment of FIG. 11, linear CCD array 206 generates pixel values 1102B, 1102G, and 1102R for the digital image from individual pixels in rows B1 through B4, G1 through G4, and R1 through R4, respectively.

Figure 12:
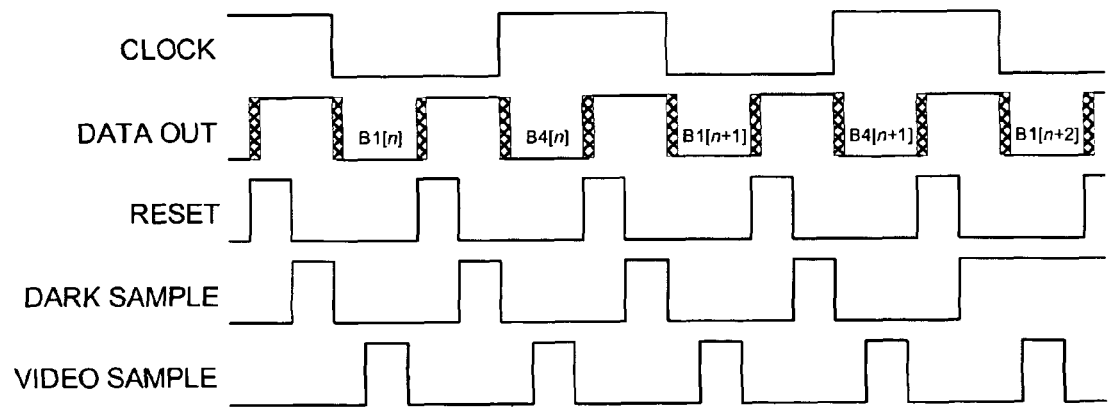
FIG. 12 is a timing diagram illustrating capturing a pixel value for an image in a fourth mode of operation of an embodiment of a linear CCD array according to one embodiment of the present disclosure.

Control unit 202 generates the signals shown in the embodiments of FIGS. 10 and 12 to generate the pixel values for the digital image from the individual pixels 1102B, 1102G, and 1102R. In one embodiment, control unit 202 causes the pixel values 1102B from rows B2 and B3 to be generated in an alternating manner as described above with reference to the embodiment of FIG. 10 and then causes the pixel values 1102B from rows B1 and B4 to be generated in an alternating manner as shown in the embodiment of FIG. 12. As shown in FIG. 12, control unit 202 generates pixel values 1102B associated with the pixels B1[n], B4[n], B1[n+1], B4[n+1], B1[n+2], etc., from rows B1 and B4 similar to the way control unit 202 generates pixel values 902B from rows B2 and B3 as described above with reference to the embodiment of FIG. 10. The pixel values 1102G and 1102R for the pixels 304G in rows G1 through G4 and the pixels 304R in rows R1 through R4, respectively, are generated in parallel with generating the pixel values 1102B as just described.

In another embodiment, control unit 202 causes the pixel values 1102B from rows B1 through B4 to be generated in a sequential manner. In this embodiment, the pixel values 1102B from row B2 are generated subsequent to the generating the pixel values 1102B from row B1, the pixel values 1102B from row B3 are generated subsequent to the generating the pixel values 1102B from row B2, and pixel values 1102B from row B4 are generated subsequent to the generating the pixel values 1102B from row B3. The pixel values 1102G and 1102R for the pixels 304G in rows G1 through G4 and the pixels 304R in rows R1 through R4, respectively, are generated in parallel with generating the pixel values 1102B as just described in this embodiment.

In one embodiment, pixels 304B each have a width of 2.7 µm and a height of 2.7 µm. In this embodiment, row B2 is offset from row B3 by a distance equal to one-half of a width of a pixel 304B, i.e., 1.35 µm, in the positive x direction, row B1 is offset from row B2 by a distance equal to one-fourth of a width of a pixel 304B, i.e., 0.675 µm, in the positive x direction, and row B4 is offset from row B3 by a distance equal to one-fourth of a width of a pixel 304B, i.e., 0.675 µm, in the positive x direction. In addition, row B2 is separated from row B3 by a distance of 4.05 µm. Pixels 304G and 304R and sets of rows 302G and 302R are similarly configured.

In one embodiment, CCD array 206 has a color to color spacing of 64.8 µm for a total optical width of 194.4 µm. In this embodiment, pixels 304 reach saturation at approximately 20,000 electrons. In this embodiment, the sensitivity of pixels 304B ranges between 0.5 and 0.9 V/lux*s with a typical value of approximately 0.7 V/lux*s, the sensitivity of pixels 304G ranges between 0.75 and 1.4 V/lux*s with a typical value of approximately 1.1 V/lux*s, and the sensitivity of pixels 304R ranges between 0.6 and 1.0 V/lux*s with a typical value of approximately 0.8 V/lux*s.

In one embodiment, CCD array 206 has a minimum saturation voltage of approximately 2.0 V with a typical value of approximately 2.5 V. In this embodiment, CCD array 206 has approximately 0.1 mV of random noise, and a maximum reset noise voltage of approximately 1.1 V with a typical value of approximately 0.9 V. In addition, CCD array 206 has a maximum dark signal voltage of approximately 2 mV with a typical value of approximately 1 mV in this embodiment. Further, CCD array 206 has a maximum DSNU of approximately 7 mV with a typical value of approximately 3 mV in this embodiment. CCD array 206 also has a maximum PRNU of approximately 20% with a typical value of approximately 10%. CCD array 206 has a maximum PRNU(3) of approximately 3 mV with a typical value of approximately 12 mV.

Although specific embodiments have been illustrated and described herein for purposes of description of the embodiments, it will be appreciated by those of ordinary skill in the art that a wide variety of alternate and/or equivalent implementations may be substituted for the specific embodiments shown and described without departing from the scope of the present disclosure. Those with skill in the art will readily appreciate that the present disclosure may be implemented in a very wide variety of embodiments. This application is intended to cover any adaptations or variations of the disclosed embodiments discussed herein. Therefore, it is manifestly intended that the scope of the present disclosure be limited only by the claims and the equivalents thereof.

What is claimed is:

1. A system comprising:
a charge coupled device (CCD) comprising a first row comprising a first plurality of pixels, a second row comprising a second plurality of pixels, a third row comprising a third plurality of pixels, and a fourth row comprising a fourth plurality of pixels; and
circuitry to generate a pixel value using at least one of the first plurality of pixels, at least one of the second plurality of pixels, at least one of the third plurality of pixels, and at least one of the fourth plurality of pixels,
wherein the first, second, third, and fourth pluralities of pixels are associated with a first color.

2. The system of claim 1 wherein the first row is offset from the fourth row in a direction that is parallel to the first and fourth rows, and wherein the second row is offset from the third row in a direction that is parallel to the second and third rows.

3. The system of claim 2 wherein the first row is offset from the fourth row by one-half of a width of one of the first plurality of pixels, and wherein the second row is offset from the third row by one-half of a width of one of the second plurality of pixels.

4. The system of claim 1 wherein the second row is adjacent to the first row, wherein the third row is adjacent to the second row, and wherein the fourth row is adjacent to the third row.

5. The system of claim 1 wherein the at least one of the first plurality of pixels is adjacent to the at least one of the second plurality of pixels, wherein the at least one of the second plurality of pixels is adjacent to the at least one of the third plurality of pixels, and wherein the at least one of the third plurality of pixels is adjacent to the at least one of the fourth plurality of pixels.

6. The system of claim 1 wherein the first color includes one of blue, green, or red.

7. A method comprising:
capturing a pixel value using at least one pixel in a first row of a charge coupled device (CCD), at least one pixel in a second row of the CCD, at least one pixel in a third row of the CCD, and at least one pixel in a fourth row of the CCD,
wherein the first, second, third, and fourth rows are associated with a first color.

8. The method of claim 7 wherein the first row is offset from the fourth row in a direction that is parallel to the first and fourth rows, and wherein the second row is offset from the third row in a direction that is parallel to the second and third rows.

9. The method of claim 7 wherein the at least one pixel in the first row is adjacent to the at least one pixel in the second row, wherein the at least one pixel in the second row is adjacent to the at least one pixel in the third row, and wherein the at least one pixel in the third row is adjacent to the at least one pixel in the fourth row.

10. The method of claim 7 wherein the second row is adjacent to the first row, wherein the third row is adjacent to the second row, and wherein the fourth row is adjacent to the third row.

11. The method of claim 7 wherein the first color includes one of blue, green, or red.

12. A scanning system comprising:
a control unit; and
a charge coupled device (CCD) comprising a first row comprising a first plurality of pixels, a second row comprising a second plurality of pixels, a third row comprising a third plurality of pixels, and a fourth row comprising a fourth plurality of pixels,
wherein the control unit is configured to cause a pixel value of an image to be captured using at least one of the first plurality of pixels, at least one of the second plurality of pixels, at least one of the third plurality of pixels, and at least one of the fourth plurality of pixels,
wherein the first, second, third, and fourth pluralities of pixels are associated with a first color.

13. The scanning system of claim 12 wherein the first row is offset from the fourth row in a direction that is parallel to the first and fourth rows, and wherein the second row is offset from the third row in a direction that is parallel to the second and third rows.

14. The scanning system of claim 12 wherein the second row is adjacent to the first row, wherein the third row is adjacent to the second row, and wherein the fourth row is adjacent to the third row.

15. The scanning system of claim 12 wherein the first color includes one of blue, green, or red.

16. A system comprising:
charge coupled device (CCD) means for sensing light comprising a first row comprising a first plurality of pixels associated with a first color, a second row comprising a second plurality of pixels associated with the first color, a third row comprising a third plurality of pixels associated with the first color, and a fourth row comprising a fourth plurality of pixels associated with the first color; and
means for merging at least one pixel value from at least one of the first plurality of pixels, at least one pixel value from at least one of the second plurality of pixels, at least one pixel value from at least one of the third plurality of pixels, and at least one pixel value from at least one of the fourth plurality of pixels to generate an image value.

17. The system of claim 16 wherein the first row is offset from the fourth row in a direction that is parallel to the first and fourth rows, and wherein the second row is offset from the third row in a direction that is parallel to the second and third rows.

18. The system of claim 16 wherein the second row is adjacent to the first row, wherein the third row is adjacent to the second row, and wherein the fourth row is adjacent to the third row.

19. The system of claim 16 wherein the first color includes one of blue, green, or red.

20. An apparatus comprising:
   a first register;
   a second register;
   a charge coupled device (CCD) comprising a first row comprising a first plurality of pixels, a second row comprising a second plurality of pixels, a third row comprising a third plurality of pixels, and a fourth row comprising a fourth plurality of pixels; and
   control logic configured to merge at least one pixel value from at least one of the first plurality of pixels and at least one pixel value from at least one of the second plurality of pixels into the first register, merge at least one pixel value from at least one of the third plurality of pixels and at least one pixel value from at least one of the fourth plurality of pixels into the second register, and merge values from the first and second registers,
   wherein the first, second, third, and fourth pluralities of pixels are associated with a first color.

21. The apparatus of claim 20 wherein the first row is offset from the fourth row in a direction that is parallel to the first and fourth rows, and wherein the second row is offset from the third row in a direction that is parallel to the second and third rows.

22. The apparatus of claim 20 wherein the second row is adjacent to the first row, wherein the third row is adjacent to the second row, and wherein the fourth row is adjacent to the third row.

23. The apparatus of claim 20 wherein the first color is selected from the group consisting of blue, green, or red.

24. A non-transitory computer-readable storage medium storing instructions that, when executed by a processor, perform a method comprising:
   capturing a pixel value using at least one pixel in a first row of a charge coupled device (CCD), at least one pixel in a second row of the CCD, at least one pixel in a third row of the CCD, and at least one pixel in a fourth row of the CCD,
   wherein the first, second, third, and fourth rows are associated with a first color.

25. The non-transitory computer-readable storage medium of claim 24 wherein the first row is offset from the fourth row in a direction that is parallel to the first and fourth rows, and wherein the second row is offset from the third row in a direction that is parallel to the second and third rows.

26. The non-transitory computer-readable storage medium of claim 24 wherein the second row is adjacent to the first row, wherein the third row is adjacent to the second row, and wherein the fourth row is adjacent to the third row.

27. The non-transitory computer-readable storage medium of claim 24 wherein the first color includes one of blue, green, or red.

* * * * *

UNITED STATES PATENT AND TRADEMARK OFFICE
CERTIFICATE OF CORRECTION

PATENT NO. : 9,270,868 B2  
APPLICATION NO. : 11/080225  
DATED : February 23, 2016  
INVENTOR(S) : Kurt E. Spears et al.

Page 1 of 1

It is certified that error appears in the above-identified patent and that said Letters Patent is hereby corrected as shown below:

On the Title Page

In item (74), Attorney, Agent, or Firm, in Column 2, Line 1, delete "Blllig" and insert -- Billig --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*